(12) United States Patent
Imura et al.

(10) Patent No.: US 9,982,647 B2
(45) Date of Patent: May 29, 2018

(54) ENGINE START SYSTEM

(71) Applicant: DENSO CORPORATION, Kariya, Aichi-pref. (JP)

(72) Inventors: Akihiro Imura, Kariya (JP); Takuro Nakaoka, Kariya (JP); Atsuyuki Hiruma, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days. days.

(21) Appl. No.: 15/408,539

(22) Filed: Jan. 18, 2017

(65) Prior Publication Data

US 2017/0204828 A1    Jul. 20, 2017

(30) Foreign Application Priority Data

Jan. 18, 2016    (JP) ................................ 2016-007025

(51) Int. Cl.
 *F02N 11/08*    (2006.01)
 *F02N 11/04*    (2006.01)

(52) U.S. Cl.
 CPC .......... *F02N 11/0844* (2013.01); *F02N 11/04* (2013.01); *F02N 2200/042* (2013.01); *F02N 2300/104* (2013.01)

(58) Field of Classification Search
 CPC .. F02N 11/0844; F02N 11/04; F02N 11/0851; F02N 11/087; F02N 2300/104; F02N 2200/042
 USPC ....... 123/179.3, 179.4, 179.28; 701/112, 113
 See application file for complete search history.

(56) References Cited

U.S. PATENT DOCUMENTS

| | | | |
|---|---|---|---|
| 6,032,632 A | 3/2000 | Bolenz et al. | |
| 6,418,899 B1 * | 7/2002 | Bluemel | F02N 11/006 123/179.28 |
| 6,807,934 B2 * | 10/2004 | Kataoka | F02N 11/006 123/179.3 |
| 6,834,632 B2 * | 12/2004 | Kataoka | F02N 11/0814 123/179.28 |
| 7,263,959 B2 * | 9/2007 | Kataoka | B60K 6/485 123/179.4 |
| 2008/0127927 A1 | 6/2008 | Hirning et al. | |
| 2010/0251851 A1 | 10/2010 | Usami et al. | |

FOREIGN PATENT DOCUMENTS

JP    2003-328907 A    11/2003

* cited by examiner

*Primary Examiner* — Hai Huynh
(74) *Attorney, Agent, or Firm* — Oliff PLC (57) ABSTRACT

An engine start system has a rotating electrical machine, a starter motor, an engine ECU and an ISG controller. The rotating electrical machine is connected to an output shaft of an engine. The starter motor drives the engine to be restarted. The engine ECU controls the engine operation. The ISG controller instructs an inverter when the rotating electrical machine performs power running and regenerative power generation. The ISG controller communicates with the engine ECU, and adjusts the operation of the starter motor and the rotating electrical machine. When receiving an engine restart request, the ISG controller drives at least one of the starter motor and the rotating electrical machine so as to restart the engine.

10 Claims, 4 Drawing Sheets

ENGINE START SYSTEM

CROSS-REFERENCE TO RELATED APPLICATION

This application is related to and claims priority from Japanese Patent Application No. 2016-007025 filed on Jan. 18, 2016, the contents of which are hereby incorporated by reference.

BACKGROUND OF THE INVENTION

1. Field of the Invention

The present invention relates to engine start systems including multiple control devices.

2. Description of the Related Art

Recently, vehicles having an idling reduction control device have become widely available so as to reduce a fuel consumption of a vehicle.

In a vehicle having the idling reduction control device, a starter motor is frequently driven so as to restart the internal combustion engine (hereinafter, the engine) of the vehicle. Further, the starter motor is requested to have a quick start capability when the internal combustion engine is restarted after an engine stop caused by the idling reduction control device. To satisfy the quick restart request, there have been proposed various types of starter motors and engine restart techniques.

For example, a patent document 1 as a conventional technique, Japanese patent No. 4068685 has disclosed a control system including a rotating electrical machine and a starter motor as an engine restart device. The control system instructs the engine to be restart by using both the starter motor and the rotating electrical machine which cooperate together.

When the engine is restarted by using both the starter motor and the rotating electrical machine which are in cooperation with each other, it is necessary to operate the starter motor and the rotating electrical machine simultaneously without causing a control-time lag between them. For example, when multiple control devices mounted on a vehicle instruct the starter motor and the rotating electrical machine to operate, it is necessary to execute a synchronous control between the multiple control devices without generating a communication delay. However, the conventional techniques have not provided a correct control method to eliminate such a communication delay between the multiple control devices.

SUMMARY

It is therefore desired to provide a control system capable of providing an engine restart process with high accuracy under cooperation between a starter motor and a rotating electrical machine without a communication delay.

An exemplary embodiment provides an engine start system having a rotating electrical machine, a starter motor, a first control device and a second control device. The rotating electrical machine is connected to an output shaft of an engine and is driven by power regulator. The power regulator allows the rotating electric machine to perform power running and to generate a regenerative power. The starter motor is configured to start and restart the engine. The first control device is capable of adjusting an operation of the engine. The second control device is capable of transmitting an instruction to the power regulator to execute power regulation when the rotating electrical machine performs the power running and regenerative power generation. The second control device communicates with the first control device. The second control device adjusts the operation of the starter motor and the rotating electrical machine. When receiving an engine restart request, the second control device instructs at least one of the starter motor and the rotating electrical machine to operate so as to correctly perform a quick restart of the engine.

In the improved structure of the engine start system previously described, when an engine start request or an engine restart request is generated, the second control device instructs, i.e. transmits an instruction signal to at least one of the starter motor and the rotating electric machine which are of targets to be driven.

In a conventional engine start system having multiple control devices, different control devices independently control a starter motor and a rotating electrical machine, respectively. However, the conventional engine start system often causes a communication delay between the multiple control devices. Further, it is necessary for the conventional engine control device to have a complicated structure in order to avoid the communication delay between the multiple control devices.

On the other hand, one control device, i.e. the second control device in the engine start system having the improved structure according to the present invention drives both the starter motor and the rotating electrical machine. This improved structure makes it possible to execute the engine start/restart process under cooperation between the starter motor and the rotating electrical machine with a simple structure.

BRIEF DESCRIPTION OF THE DRAWINGS

A preferred, non-limiting embodiment of the present invention will be described by way of example with reference to the accompanying drawings, in which.

DETAILED DESCRIPTION OF THE PREFERRED EMBODIMENTS

Hereinafter, various embodiments of the present invention will be described with reference to the accompanying drawings. In the following description of the various embodiments, like reference characters or numerals designate like or equivalent component parts throughout the several diagrams.

EXEMPLARY EMBODIMENT

A description will be given of a structure and behavior of an engine start system, which can be mounted to various types of vehicles, according to an exemplary embodiment with reference to FIG. 1 to FIG. 6.

Figure 1:
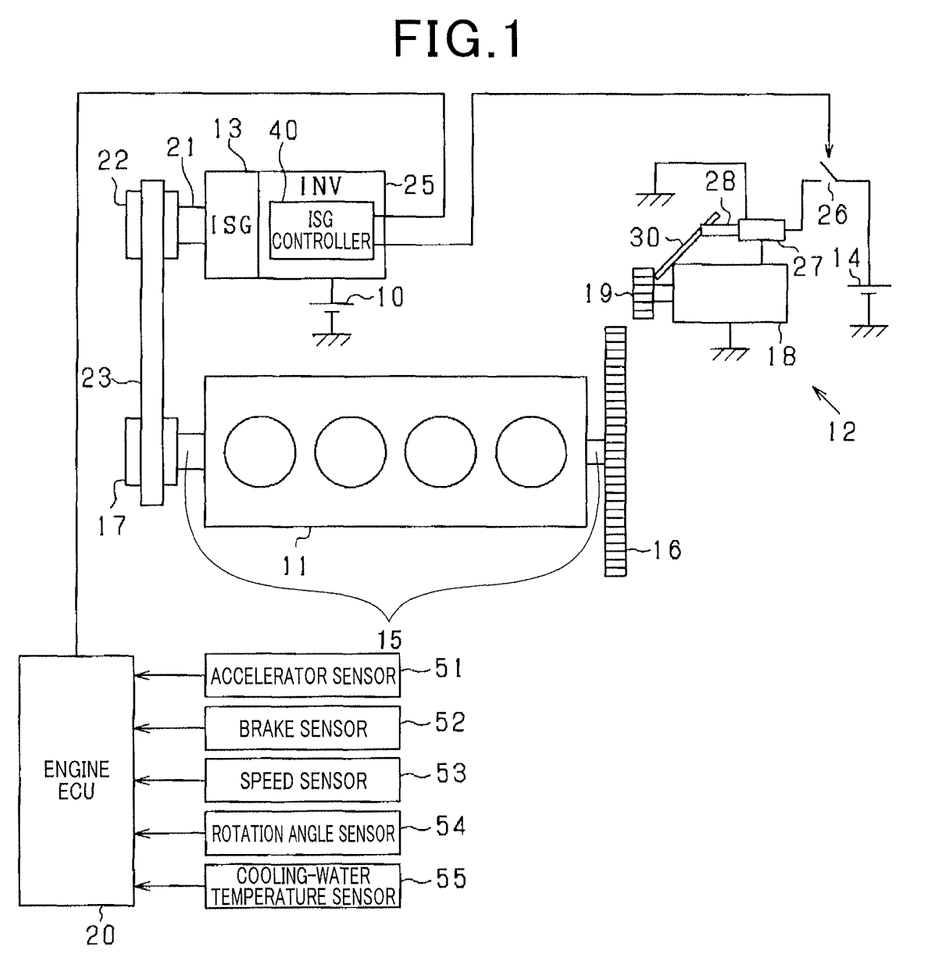
FIG. 1 is a view showing a schematic structure of an engine start system mounted on a vehicle according to an exemplary embodiment of the present invention.

FIG. 1 is a view showing a schematic structure of the engine start system mounted on a vehicle according to the exemplary embodiment. As shown in FIG. 1, the vehicle has an internal combustion engine (hereinafter, the engine 11) and the engine start system. The engine 11 is a multi-cylinder four cycle engine, for example. The engine start system has a starter motor 12, a rotating electrical machine 13 and batteries 10 and 14. One end of an output shaft 15 of the engine 11 is fixed to a ring gear 16 which acts as a driven gear. The other end of the output shaft 15 of the engine 11 is fixed to a pulley 17 which acts as a driven unit.

The starter motor 12 is of a pinion moving type in which a pinion gear 19 is moving to be engaged with the ring gear 16. That is, the starter motor 12 has a motor unit 18, the pinion gear 19 and a solenoid 27. The motor unit 18 and the solenoid 27 belong to a drive section. The pinion gear 19 moves, i.e. is pushed toward the axial direction of the pinion gear 19 to the ring gear 16. The pinion gear 19 rotates when receiving a rotation power supplied from the motor unit 18. The solenoid 27 drives a plunger 28 to move toward the axial direction of the plunger 28. The solenoid 27 is electrically connected to the battery 14 through a switch unit 26.

The ring gear 16 is arranged in the axial direction of the pinion gear 19. When the switch unit 26 is turned off, the solenoid 27 does not operates, and the pinion gear 19 is not engaged with the ring gear 16. That is, the ring gear 16 is not connected to the pinion gear 19.

As shown in FIG. 1, when the switch unit 26 is turned on, the solenoid 27 drives the plunger 28 to move in the axial direction of the pinion gear 19. The plunger 28 pushes the lever 30, and the pinion gear 19 is pushed, i.e. extends in the axial direction by the lever 30. Finally, the pinion gear 28 is engaged with the ring gear 16.

An electric contact (not shown) is arranged on the plunger 28 opposite of the lever 30. When the plunger 28 moves in the axial direction of the pinion gear 19, the electric contact is turned on and electric power from the battery 14 is supplied to the motor unit 18. When the motor unit 18 starts to rotate, the pinion gear 19 also starts to rotate because of being connected to the motor unit 18.

After the ring gear 16 is correctly engaged with the pinion gear 19, the engine 11 starts to rotate. When the battery 14 supplies electric power to the motor unit 18 in the starter motor 12, the motor unit 18 starts to rotate. The motor unit 18 provides initial rotation energy to the output shaft 15 of the engine 11 through the pinion gear 19 and the ring gear 16. During the cranking of the starter motor 12, the engine 11 initiates fuel combustion and starts to operate, and a rotation speed of the engine 11 increases.

The rotating electrical machine 13 is of a belt-type comprised of a three phase alternating current rotary machine. The drive pulley 12 is arranged on the rotary shaft 21 of the rotating electric machine 13. The driven pulley of the engine 11 is connected to the drive pulley 22 of the rotating electrical machine 13 by a belt 23.

When the engine 15 rotates, the output shaft 15 of the engine 11 rotates, and the rotary shaft 21 of the rotating electrical machine 13 rotates by the rotary power of the output shaft 15 of the engine 11.

On the other hand, the output shaft 15 of the engine 11 also rotates by the rotation power of the rotary shaft 21 of the rotating electrical machine 13 (as a motor function).

The rotating electrical machine 13 has the following motor functions: a regenerative power generation function, an engine start function, and a torque assist function. That is, the rotating electrical machine 13 has the three functions, the regenerative power generation function, the engine start function and the torque assist function. The rotating electrical machine 13 is driven by an inverter 25 as an electric power regulation circuit to perform power running and regenerative power generation. The function of the inverter 25 will be explained later in detail. Accordingly, the rotating electrical machine 13 is an integrated starter generator (ISG).

As the regenerative power generation function, the rotating electrical machine 13 receives a rotation power of the output shaft 15 of the engine 11 and automotive axles (not shown), and generates a regenerative power.

As the engine start function, the rotating electrical machine 13 provides an initial rotation to the output shaft 15 of the engine 11. This makes it possible for the engine 11 to start to operate.

As the torque assist function, the rotating electrical machine 13 provides a torque to the output shaft 15 of the engine 11 in order to accelerate the speed of the vehicle.

In the exemplary embodiment, the engine 11 of the vehicle can start and restart by using at least one of the starter motor 12 and the rotating electrical machine 13.

The rotating electrical machine 13 and the inverter 25 are assembled to be together. The inverter 25 is an electric power regulation circuit. The inverter 25 is also connected to the battery 10. The inverter 25 consists of multiple semiconductor switching elements. The structure of the inverter 25 is widely known. The power conversion is executed on the basis of the switching state of the switching elements in the inverter 25. That is, an alternating current power (AC power) is converted to a direct current (DC) power on the basis of the switching state of the switching elements in the inverter 25.

In the power generation by the rotating electrical machine 13, the inverter 25 converts the AC power generated by the rotating electrical machine 13 to the DC power, and the battery 10 is charged by the converted DC power supplied from the inverter 25.

On the other hand, in the engine start or the torque assist by the rotating electrical machine 13, the battery 10 supplies DC power to the inverter 25, the inverter 25 converts this DC power to AC power, and supplies the generated AC power to the rotating electrical machine 13. When receiving the AC power supplied form the inverter 25, the rotating electrical machine 13 is driven.

The engine start system according to the exemplary embodiment is equipped with an engine ECU (engine Electronic control unit) 20 and an ISG (Integrated Starter generator) controller 40. The engine ECU 20 is a first control device, and the ISG controller 40 is a second control device.

Each of the engine ECU 20 and the ISG controller 40 has a microcomputer composed of a central processing unit (CPU), a memory unit, etc. The memory unit is composed of a read only memory (ROM) and a random access memory (RAM). Each of the engine ECU 20 and the ISG controller 40 executes programs stored in the ROM.

As shown in FIG. 1, the ISG controller 40 the inverter 25 are assembled together. That is, the rotating electrical machine 13, the inverter 25 and the ISG controller 40 are assembled together. The engine ECU 20 and the ISG controller 40 execute bidirectional communication with each other.

The engine start system according to the exemplary embodiment uses various types of sensors, for example, an accelerator sensor 51, a brake sensor 52, a speed sensor 53, a rotation angle sensor 54, a cooling-water temperature sensor 55, etc. which are mounted on the vehicle. The engine ECU 20 receives detection signals transmitted from the sensors, and executes various control operations, for example, a fuel injection amount control and an ignition time control, etc. on the basis of the received detection signals.

That is, the accelerator sensor 51 detects a depressed amount of the accelerator pedal when the accelerator pedal 51 is depressed by the driver' foot. The brake sensor 52 detects a depressed amount of the brake pedal when the brake pedal 52 is depressed by the driver' foot. The speed sensor 53 detects a vehicle speed. The rotation angle sensor 54 detects a rotation speed of the engine 11. The cooling-water temperature sensor 55 detects a temperature of cooling water to cool the engine 11. These sensors 51, 52, 53, 54 and 55 successively transmit the detection signals to the engine ECU 20.

The ISG controller 40 executes the automatic stop idling control. This automatic stop idling control allows the engine 11 to automatically stop when a predetermined automatic engine stop condition is satisfied, and further allows the engine 11 to be automatically restarted when a predetermined automatic engine restart condition is satisfied.

The predetermined automatic engine stop condition and the predetermined automatic engine restart condition include the vehicle speed, the driver's operation to the accelerator pedal, and the driver's operation of the brake pedal, etc.

When there is a predetermined acceleration request (torque assist request) to accelerate the vehicle speed during the operation of the engine 11, the ISG controller 40 executes the torque assist by using the rotating electrical machine 13. Further, the ISG controller 40 executes a regenerative power generation process when there is a predetermined request to generate a regenerative power.

The ISG controller 40 detects the assist request when the driver depresses the accelerator pedal. Further, the ISG controller 40 detects the regenerative request to generate the regenerative power when the driver depresses the brake pedal of the vehicle.

A description will now be given of the automatic engine restart control which is executed by the ISG controller 40.

The ISG controller 40 determines a target current value on the basis of a start torque which is necessary to execute the cranking of the engine 11 in order to restart the engine 11. The ISG controller 40 instructs the inverter 25 on the basis of the target current value. The inverter 25 generates a target current corresponding to the target current value, and supplies the target current to the rotating electrical machine 13. The rotating electrical machine 13 generates a drive torque as a start torque. When the start torque is transmitted to the output shaft 15 of the engine 11 from the rotating electrical machine 13, the cranking operation of the engine 11 starts. The engine 11 is restarted.

In the automatic restart of the engine 11 when a traffic signal has been switched to green from red, which allows the vehicle to go forward after the stopped idling state, it is requested to quickly and reliably restart the engine 11.

In order to satisfy this requirement, the engine start system according to the exemplary embodiment instructs both the starter motor 12 and the rotating electrical machine 13 to supply its output torque to the output shaft 15 of the engine 11.

If the vehicle has two control devices, one control device controls the operation of the starter motor 12 and the other control device controls the operation of the rotating electrical machine 13, there is a possible inconvenience because of it being necessary to operate both the starter motor 12 and the rotating electrical machine 13 correctly and simultaneously at the timing when the engine 11 restarts. When the cooperative operation between the starter motor 12 and the rotating electrical machine 13 does not occur, the restart-ability of the engine 11 becomes deteriorated.

In order to avoid this drawback the engine start system according to the exemplary embodiment has the ISG controller 40 which has the function to control the operation of the starter motor 12 and the operation of the rotating electrical machine 13.

For example, the engine restart request is generated when the driver of the vehicle depresses the accelerator pedal or releases the brake pedal, etc. When the engine restart request is generated, the ISG controller 40 supplies a drive instruction to at least one of the starter motor 12 and the rotating electrical machine 13 to restart the engine 11.

Specifically, the ISG controller 40 selects one of a first start process, a second start process and a third start process on the basis of a rotation speed of the vehicle when the engine 11 is restarted:

(a) The first start process in which the engine 11 is restarted by the starter motor 12 only;

(b) The second start process in which the engine 11 is restarted by the rotating electrical machine 13 only; and (c) The third start process in which the engine 11 is restarted by the starter motor 12 and the rotating electrical machine 13 simultaneously.

In the first start process, when the switch unit 26 is turned on, the plunger 28 moves toward the axial direction of the plunger 28, and forwardly pushes the pinion gear 19 along its axial direction, and the pinion gear 19 starts to operate. The pinion gear 19 extends to the ring gear 16 and is finally and correctly engaged with the ring gear 16. The starter motor 12 supplies its rotation power to the ring gear 16 through the pinion gear 19, and the engine 11 starts to operate. The engine 11 is thereby restarted.

On the other hand, in the second start process, when the inverter 25 supplies the DC power to the rotating electrical machine 13, the rotating electrical machine 13 starts to operate. The rotating electrical machine 13 provides the rotation power to the engine 11 through the belt 23. The engine 11 is restarted.

In the third start process, when the switch unit 26 is turned on and the inverter 25 supplies the DC power to the rotating electrical machine 13, both the starter motor 12 and the rotating electrical machine 13 supply the rotation power simultaneously to the engine 11. The engine 11 is thereby restarted.

A description will now be given of the engine restart control executed by the ISG controller 40 and the engine ECU 20 with reference to FIG. 2. The ISG controller 40 repeatedly executes the engine restart control every predetermined period.

Figure 2:
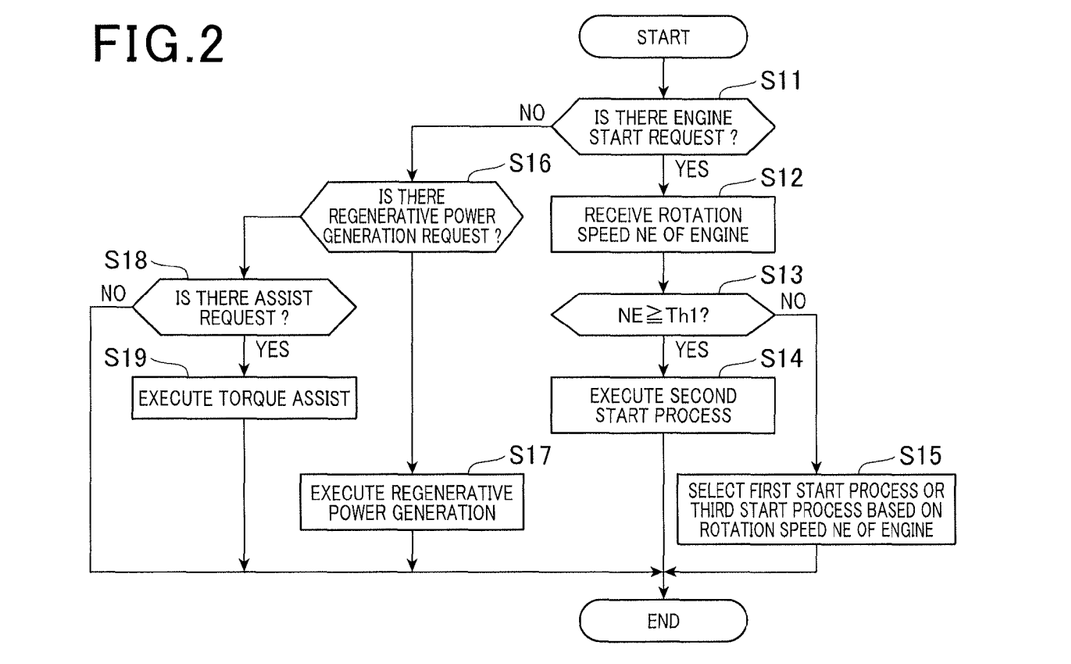
FIG. 2 is a view showing a flow chart of an engine restart process executed by the engine start system according to the exemplary embodiment shown in FIG. 1.

FIG. 2 is a view showing a flow chart of the engine restart process executed by the engine start system according to the exemplary embodiment shown in FIG. 1.

In step S11 shown in FIG. 2, the engine ECU 20 detects whether the engine restart request is generated. For example, the engine ECU 20 detects the generation of the engine restart request when the driver of the vehicle depresses the accelerator pedal during the automatically-stopped state of the engine 11 caused due to the satisfaction of the predetermined automatic engine stop condition.

When the detection result in step S11 indicates affirmation ("YES" in step S11), i.e. the engine restart request has been generated, the operation flow progresses to step S12.

In step S12, the engine ECU 20 receives a rotation speed NE of the engine 11. The operation flow progresses to step S13.

In step S13, the engine ECU 20 detects whether the rotation speed NE of the engine obtained in step S12 is not less than a predetermined rotation speed Th1. That is, the engine ECU 20 detects the engine restart request is generated during a period to a timing when the rotation speed NE of the engine 11 reaches the predetermined rotation speed Th1 from a timing when a fuel injection to the engine 11 has been stopped.

When the detection result in step S13 indicates negation ("NO" in step S13), i.e. the rotation speed NE of the engine obtained in step S12 is less than the predetermined rotation speed Th1, the operation flow progresses to step S15.

In step S15, the ISG controller 40 determines to execute the engine restart process by using the starter motor 12. That is, the ISG controller 40 selects one of the first start process by using the starter motor 12 only and the third start process by using both the starter motor 12 and the rotating electrical machine 13. After this, the ISG controller 40 executes the selected start process, i.e. the first start process or the third start process. It is preferable for the ISG controller 40 to select one of the first start process and the third start process on the basis of the rotation speed of the engine 11 when the engine restart request is generated.

For example, the ISG controller 40 selects the first start process when the rotation speed NE of the engine 11 is not less than a predetermined rotation speed Th2. Further, the ISG controller 40 selects the third start process when the rotation speed NE of the engine 11 is less than the predetermined rotation speed Th2.

When the detection result in step S13 indicates affirmation ("YES" in step S13), the operation flow progresses to step S14.

In step S14, the ISG controller 40 selects and executes the second start process by using the rotating electrical machine 13 only.

In the engine restart process, it is necessary for the engine 11 to receive a start torque which is larger than that when the rotation speed NE of the engine 11 is high. Because the starter motor 12 generates the drive torque which is stronger than that of the rotating electrical machine 13, the ISG controller 40 executes one of the first start process by using the starter motor 12 and the third start process by using the starter motor 12 and the rotating electrical machine 13 when the rotation speed NE of the engine 11 is less than the predetermined rotation speed Th1 ("NO" in step S13).

On the other hand, when the rotation speed NE of the engine 11 is not less than the predetermined rotation speed Th1 ("YES" in step S13), the ISG controller 40 executes one of the second start process by using the rotating electrical machine 13 only.

When the detection result in step S11 indicates negation ("NO" in step S11), the operation flow progresses to step S16.

In step S16, the ISG controller 40 detects whether the regenerative power generation request is transmitted from the engine ECU 20.

The engine ECU 20 detects whether or not the driver of the vehicle operates the brake pedal or the accelerator pedal. The engine ECU 20 generates the regenerative request when the driver of the vehicle depresses the brake pedal or releases the accelerator pedal. The engine ECU 20 transmits the regenerative request to the ISG controller 40. When the detection result in step S16 indicates affirmation ("YES") in step S16, i.e. the regenerative power generation request has been transmitted from the engine ECU 20, the operation flow progresses to step S17.

In step S17, the ISG controller 40 executes the regenerative power generation process.

On the other hand, when the detection result in step S16 indicates negation ("NO" in step S16), the operation flow progresses to step S18.

In step S18, the engine ECU 20 detects whether the torque assist request is received.

When the driver of the vehicle depresses the accelerator pedal by not less than a predetermined distance, the engine ECU 20 detects the generation of the assist request. When detecting the generation of the assist request, the engine ECU 20 transmits the assist request to the ISG controller 40.

When the detection result in step S18 indicates affirmation ("YES"), i.e. the torque assist request has received, the operation flow progresses to step S19.

In step S19, the ISG controller 40 executes the torque assist operation.

The engine start system according to the exemplary embodiment having the improved structure previously described has the following effects.

In the engine start system having the structure previously described, when receiving the engine start request, the ISG controller 40 provides the drive instruction to at least one of the starter motor 12 and the rotating electrical machine 13 on the basis of the received engine start request which has been generated due to the speed of the vehicle.

When compared with a conventional engine start system in which control devices independently drive the starter motor 12 and the rotating electrical machine 13, respectively, the ISG controller 40 in the engine start system according to the exemplary embodiment drives both the starter motor 12 and the rotating electrical machine 13. This makes it possible to cooperatively drive the starter motor 12 and the rotating electrical machine 13 in order to smoothly restart the engine 11.

In particular, the ISG controller 40 instructs the switch unit 26 to turn on and off so as to drive the starter motor 12 according to the engine start request, and further instructs the inverter 25 so as to adjust the DC power of the rotating electrical machine 13. This structure makes it possible to correctly adjust the optimum timing when the starter starts to operate and the optimum timing when the rotating electrical machine 13 starts to operate, and avoid the startability of the engine 11 from reducing.

Further, the ISG controller 40 has the function to select one of the first start process, the second start process and the third start process as previously described. This structure makes it possible for the ISG controller 40 to select one of the first start process, the second start process and the third start process and to receive the control signal transmitted from the engine ECU 20 and to transmit the drive instruction signals to the starter motor 12 and the rotating electrical machine 13. Further, it is possible for the structure of the engine start system to avoid a delay to receive and send various instruction signals, and to execute correctly the engine start process. Still further, it is therefore possible to produce the engine start system with a simple structure and to reduce the manufacturing cost of producing the engine start system.

It is desirable to maintain the engine startablity and to quickly restart the engine 11 when the engine restart request is generated.

In the engine start system according to the exemplary embodiment, the ISG controller 40 has the function of automatically stopping and restarting the engine 11. When the predetermined engine restart condition is satisfied and the rotation speed NE of the engine 11 is less than the predetermined rotation speed Th1, the ISG controller 40 executes the first start process or the third start process. Further, when the predetermined engine restart condition is satisfied and the rotation speed NE of the engine 11 is less than the predetermined rotation speed Th1, the ISG controller 40 executes the second start process. Because the ISG controller 40 has the structure and behavior previously described, the ISG controller 40 can execute the series of the engine restart process while considering the rotation speed NE of the engine 11. For this reason, it is possible for the engine start system according to the exemplary embodiment to maintain the superior engine startability function and quickly restart the engine 11 when the predetermined engine restart condition is satisfied.

Various Modifications.

The concept of the present invention is not limited by the exemplary embodiment previously described. It is possible for the engine start system to have the following modifications.

The engine 11 requires a relatively large torque at the beginning time in the engine restart period so as to operate the output shaft 15 of the engine 11. Further, the starter motor 12 uses an electric power consumption which is larger than that of the rotating electrical machine 13. In the engine start system according to the exemplary embodiment, the ISG controller 40 executes the third start process by using the starter motor 12 and the rotating electrical machine 13 in order to restart the engine 11. However, the concept of the present invention is not limited by this. For example, it is possible to use another engine start process in which the ISG controller 40 drives the starter motor 12 firstly, and stops the operation of the starter motor 12, and then drives the rotating electrical machine 13. That is, it is acceptable for the ISG controller 40 to instruct the starter motor 12 and the rotating electrical machine 13 so as to sequentially drive the starter motor 12 and the rotating electrical machine 13 in order, not to drive both the starter motor 12 and the rotating electrical machine 13 simultaneously.

In this case, because the starter motor 12 is capable of supplying a drive torque which is larger than that of the rotating electrical machine 13 and the ISG controller 40 drives the starter motor 12 at the beginning time of the engine restart period, this control makes it possible to provide the superior engine startability.

In addition, the ISG controller 40 stops the operation of the starter motor 12 after having supplied the large drive torque to the output shaft 15 of the engine 11. Further, the ISG controller 40 instructs the rotating electrical machine 13 to supply the drive torque to the output shaft 15 of the engine 11 after the starter motor 12 has stopped. This control makes it possible to increase the engine startability and suppress the power consumption of the engine start system at the engine restart period.

In the structure of the engine start system according to the exemplary embodiment, the ISG controller 40 executes the modified process of the third start process, as previously explained, in which the starter motor 12 and the rotating electrical machine 13 are sequentially driven. In the modified process of the third start process, the ISG controller 40 generates and transmits the drive signal to the starter motor 12 to stop the operation of the starter motor 12, and generates and transmits the drive signal to the rotating electrical machine 13 to drive the rotating electrical machine 13 without using the engine ECU 20. This structure makes it possible to avoid the drive signal transmission timing from being delayed between the engine ECU 20, the ISG controller 40, the starter motor 12 and the rotating electrical machine 13. This makes it possible for the ISG controller 40 to correctly execute the drive transition from the starter motor 12 to the rotating electrical machine 13.

When the engine start process is executed by using the starter motor 12, it is possible to detect whether the starter motor 12 correctly supplies the start torque to the engine output shaft 15 of the engine 11 by monitoring the start torque of the engine output shaft 15 of the engine 11. Accordingly, the ISG controller 40 obtains the start torque of the engine output shaft 15 of the engine 11 in the third start process, and detects occurrence of abnormality of the starter motor 12 on the basis of the monitored start torque. In this case, the ISG controller 40 detects whether or not the abnormality of the starter motor 12, i.e. the starter motor of the starter motor 12 occurs on the basis of the start torque which is the sum of the drive torque of the rotating electrical machine 13 and the drive torque of the starter motor 12 under the drive state in which the starter motor 12 and the rotating electrical machine 13 are driven.

A description will be given of the abnormality detection process of the starter motor 12 executed by the ISG controller 40 with reference to FIG. 3.

Figure 3:
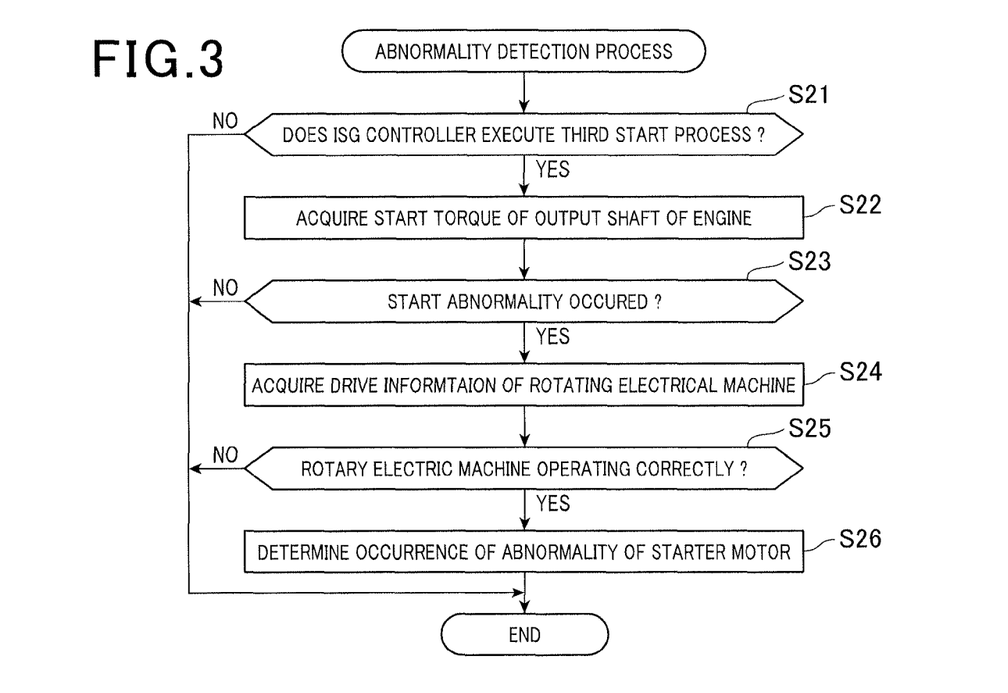
FIG. 3 is a view showing a flow chart of an abnormality detection process for detecting an abnormality of a starter motor mounted on the vehicle executed by the engine start system according to the exemplary embodiment shown in FIG. 1.

FIG. 3 is a view showing a flow chart of the abnormality detection process for detecting an abnormality of the starter motor 12 mounted on the vehicle executed by the engine start system according to the exemplary embodiment shown in FIG. 1.

The ISG controller 40 repeatedly executes the abnormality detection process of the starter motor 12 every predetermined period after the predetermined automatic engine stop condition has been satisfied and the engine 11 has stopped.

In step S21 shown in FIG. 3, the ISG controller 40 detects whether the third start process has been executed.

When the detection result in step S21 indicates affirmation ("YES" in step S21), i.e. the third start process has been executed, the operation flow progresses to step S22.

In step S22, the ISG controller 40 receives the start torque of the output shaft 15 of the engine 11. The operation flow progresses to step S23.

In step S23, the ISG controller 40 detects whether the engine start process is correctly executed. For example, it is acceptable for the ISG controller 40 to acquire the start torque of the output shaft 15 of the engine 11 on the basis of the detection result detected by the torque sensor mounted on the output shaft 15 of the engine 11. If the obtained start torque does not reach a predetermined torque value, the ISG controller 40 detects the occurrence of abnormality of the starter motor 12.

When the detection result in step S23 indicates affirmation ("YES" in step S23), i.e. the engine start process is correctly executed, the operation flow progresses to step S24.

In step S24, the ISG controller 40 acquires drive information of the rotating electrical machine 13. That is, the TSG controller 40 receives a voltage of the battery 10 and the drive torque of the rotating electrical machine 13 at the engine start beginning time as the drive information of the rotating electrical machine 13. The operation flow progresses to step S25.

In step S25, the ISG controller 40 detects whether the rotating electrical machine 13 outputs the normal drive torque to the output shaft 15 of the engine 11.

When the detected voltage of the battery 10 is more than a predetermined voltage value and drive torque of the rotating electrical machine 13 is not less than a predetermined drive torque, the ISG controller 40 judges that the rotating electrical machine 13 executes correctly.

When the detection result in step S25 indicates affirmation ("YES" in step S25), i.e. the rotating electrical machine 13 outputs the normal drive torque to the output shaft 15 of the engine 11, the operation flow progresses to step S26.

In step S26, the ISG controller 40 detects an occurrence of abnormality of the starter motor 12 because the drive torque of the starter motor 12 does not reach the predetermined drive torque value.

According to the structure and control behavior of the ISG controller 40 previously described, it is possible for the ISG controller 40 to execute the series of the engine start processes including the abnormality detection process because the ISG controller 40 detects the occurrence of abnormality of the starter motor 12.

As previously described, the engine start system according to the exemplary embodiment has the improved structure in which the ISG controller 40 executes the third start process on the basis of the rotation speed NE of the engine 11 at the engine restart timing after the engine 11 has automatically stopped. However, the concept of the present invention is not limited by this structure. For example, it is possible for the ISG controller 40 to execute the third start process at an initial start timing of the engine 11 due to the driver's operation to an ignition switch of the vehicle.

The engine start system according to the exemplary embodiment has the improved structure in which the ISG controller 40 executes one of the first start process, the second start process and the third start process on the basis of the rotation speed NE of the engine 11 when the engine 11 starts and restarts. However, the concept of the present invention is not limited by this structure. For example, it is possible for the ISG controller 40 to select and execute one of the first start process, the second start process and the third start process on the basis of a temperature of engine cooling water or a voltage of each of the battery 10 and the battery 14.

When a temperature of the cooling water is low, i.e. not more than a predetermined temperature value, because it can be considered that the engine 11 has a large friction, the engine 11 requires a large drive torque in this case when compared with the case in which the temperature of the cooling water is high, i.e. more than the predetermined temperature value. In this case, the ISG controller 40 executes one of the first start process and the third start process. On the other hand, the ISG controller 40 executes the second start process.

Further, in a case in which the battery 10 supplies a low voltage, because it can be considered that a discharge current which flows in the rotating electrical machine 13 becomes small when compared with a discharge current when the battery 10 supplies a high voltage. For this reason, it is preferable for the ISG controller 40 to execute one of the first start process and the third start process when the battery 10 supplies a low voltage.

Because the discharge current which flows in the starter motor 12 when the battery 14 supplies a low voltage becomes small when compared with a case in which the battery 11 can supply a high voltage, it can be considered for the starter motor 12 only to be difficult to start the engine 11. Accordingly, it is preferable for the ISG controller 40 to execute the third start process when the battery 10 supplies a low voltage.

It is also acceptable for the ISG controller 40 to execute coasting control. The driver drives the vehicle under coasting when the clutch mechanism disengages the engine 11 from the wheels of the vehicle.

During coasting (i.e. a coasting drive mode) when the clutch mechanism disengages the engine 11 from the wheels of the vehicle under the engine stopped state, when a predetermined coasting release condition such as an acceleration condition and a brake condition are satisfied, the ISG controller 40 instructs the clutch mechanism to engage the engine 11 with the wheels (as the power transmission state), and releases the coasting drive mode, and instructs the engine 11 to restart. In this case, it is preferable for the ISG controller 40 to execute the third start process on the basis of the rotation speed NE of the engine 11, the temperature of the cooling water, and the voltage of the battery 10.

As previously described, the engine start system according to the exemplary embodiment has the improved structure in which the battery 14 supplies electric power to the starter motor 12 and the battery 10 supplies electric power to the rotating electrical machine 13. However, the concept of the present invention is not limited by this structure. For example, it is acceptable for a single battery to supply electric power to both the starter motor 12 and the rotating electrical machine 13.

As previously described, the engine start system according to the exemplary embodiment has the structure in which when the switch unit 26 is turned on, the battery 14 supplies electric power to the solenoid 27. When receiving the electric power, the solenoid 27 pushes the plunger 28 toward the axial direction of the solenoid 27. When the plunger 28 pushes the lever 30, the lever 30 pushes the pinion gear 19 toward the axial direction of the pinion gear 19. When the motor unit 18 receives the electric power supplied from the battery 14 through the switch unit 26, the motor unit 18 and the pinion gear 19 also rotate, respectively. However, the concept of the present invention is not limited by this structure.

Figure 4:
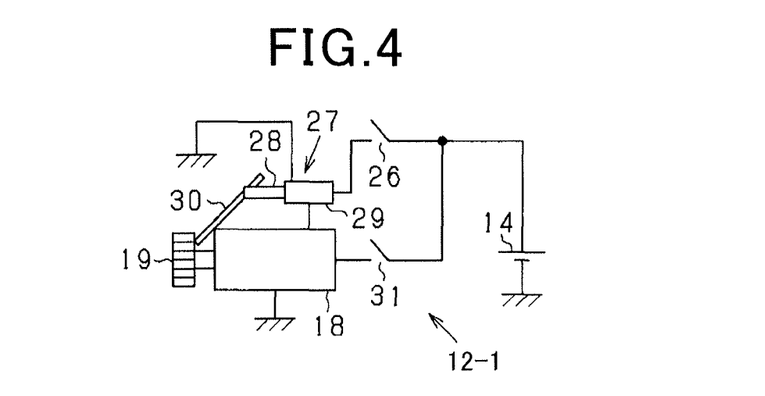
FIG. 4 is a view showing another structure as a modification of the starter motor mounted on the vehicle.

FIG. 4 is a view showing another structure of the starter motor 12-1 mounted on the vehicle. As shown in FIG. 4, it is possible for the starter motor 12 to have an additional switch unit 31 in addition to the switch unit 26.

The switch unit 26 is used for supplying electric power to the solenoid 27 to perform the pushing control process of the pinion gear 19 to the ring gear 16. On the other hand, the switch unit 31 is used for supplying electric power to the motor unit 18 only so as to operate the motor unit 18. This structure makes it possible for the ISG controller 40 to independently drive the pinion gear 19 and the motor unit 18. In particular, when the engine 11 is restarted after the automatic engine stop by the idling reduction process, it is preferable for the ISG controller 40 (omitted from FIG. 4) to turn on the switch 26 after the switch unit 31 is switched from the turned-off state to the turned-on state.

This improved structure makes it possible to push the pinion gear 19 to the ring gear 16 under its inertial rotation. This makes it possible to smoothly and correctly engage the pinion gear 19 with the ring gear 16.

In the structure of the engine start system using the starter motor 12-1 shown in FIG. 4, it is acceptable for the ISG controller 40 to execute the pushing control process of the pinion gear 19 in order to suppress swing and vibration of the output shaft 15 of the engine 11 to be as small as possible when the output shaft 15 of the engine 11 stops rotating after the transmission of an engine stop instruction to the engine 11.

Specifically, during the inertial rotation of the output shaft 15 of the engine 11 (i.e. during the inertial rotation of the ring gear 16) after the fuel injection into the engine 11 has been stopped, the ISG controller 40 turns on the switch unit 26 so as to engage the pinion gear 19 with the ring gear 16. This engagement supplies the inertial mass of the starter motor 12 to the ring gear 16, and suppresses swing and vibration of the output shaft 15 of the engine 11.

When the engine 11 stops, the ISG controller 40 instructs the solenoid 27, i.e. the switch unit 26 to push the pinion gear 19 to the ring gear 16 when a difference in rotation speed between the ring gear 16 and the pinion gear 19 becomes less than a predetermined value.

Figure 5:
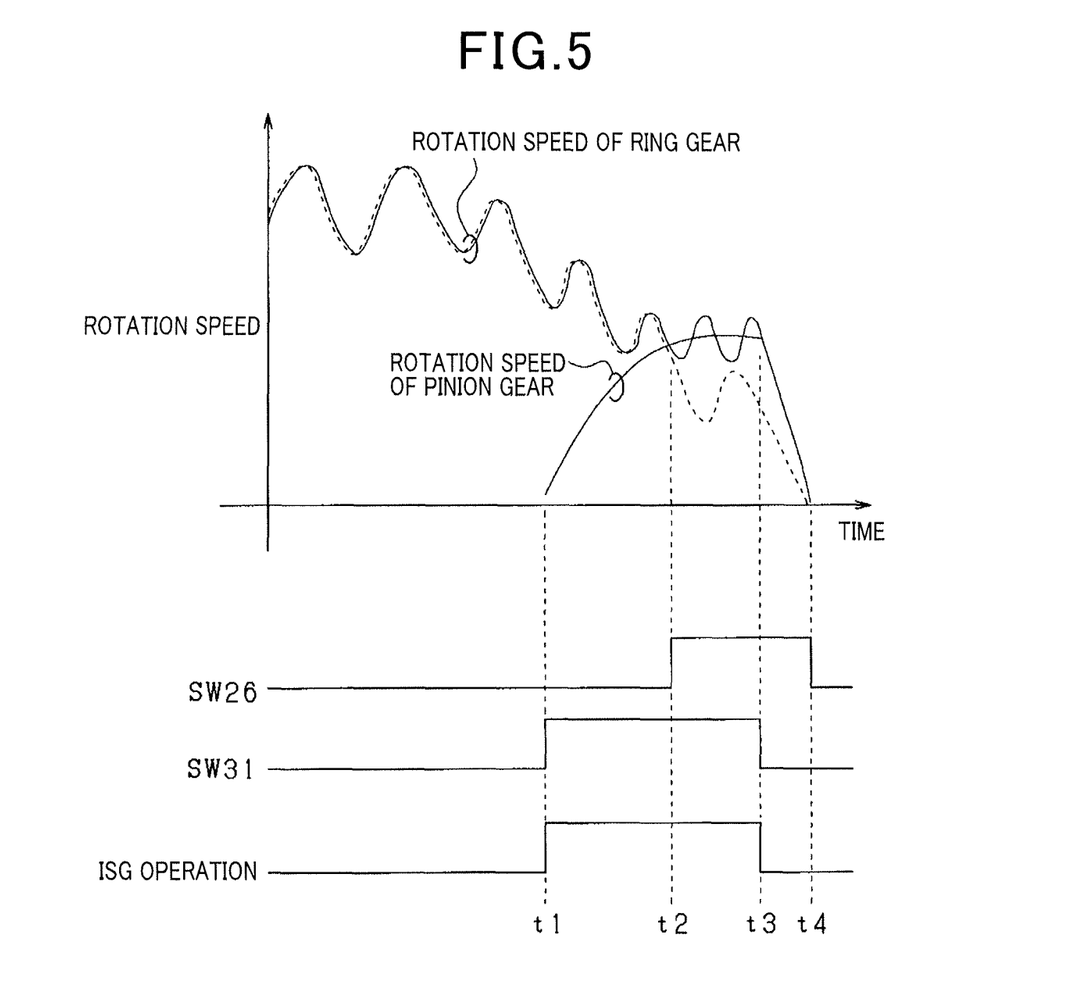
FIG. 5 is a view schematically explaining a pushing control executed by the engine start system according to the modification of the exemplary embodiment shown in FIG. 4.

FIG. 5 is a view schematically explaining a pushing control process executed by the engine start system according to the modification of the exemplary embodiment shown in FIG. 4.

In FIG. 5, a solid line indicates the behavior of the ring gear 16 and the pinion gear 19 in the engine start system according to the modification of the exemplary embodiment. On the other hand, a dotted line indicates the behavior of a conventional engine start system as a comparative example.

As shown in FIG. 5, the rotation speed of the engine 11 gradually reduces in a rotation speed reduction period after the automatic engine stop. At a timing t1 during the rotation speed reduction period, the ISG controller 40 turns on the switch unit 31 to start the motor unit 18 to operate. Further, the rotation speed of the ring gear 13 is adjusted by the rotation of the rotating electrical machine 13. At the timing t2, the ISG controller 40 detects that the rotation speed of the ring gear 16 becomes equal to the rotation speed of the pinion gear 19. Accordingly, at the timing t2, when the ISG controller 40 turns on the switch unit 26, the pinion gear 19 extends, i.e. is pushed to the ring gear 16, and the pinion gear 19 is correctly and smoothly engaged with the ring gear 16. At a timing t3, the ISG controller 40 turns off the switch unit 31 because the pinion gear 19 has been correctly engaged with the ring gear 16. The rotation of the motor unit 18 thereby stops, and the rotating electrical machine 13 also stops. At a timing t4, the ISG controller 40 turns off the switch unit 26.

On the other hand, in the comparative case designated by the dotted line, the rotation speed of the ring gear largely fluctuates and vibrates during the period from the timing t2 to the timing t3. This prevents the correct engagement of the pinion gear 19 with the ring gear 16.

A description will now be given of the pushing control process of the pinion gear 19 executed by the ISG controller 40 with reference to FIG. 6.

Figure 6:
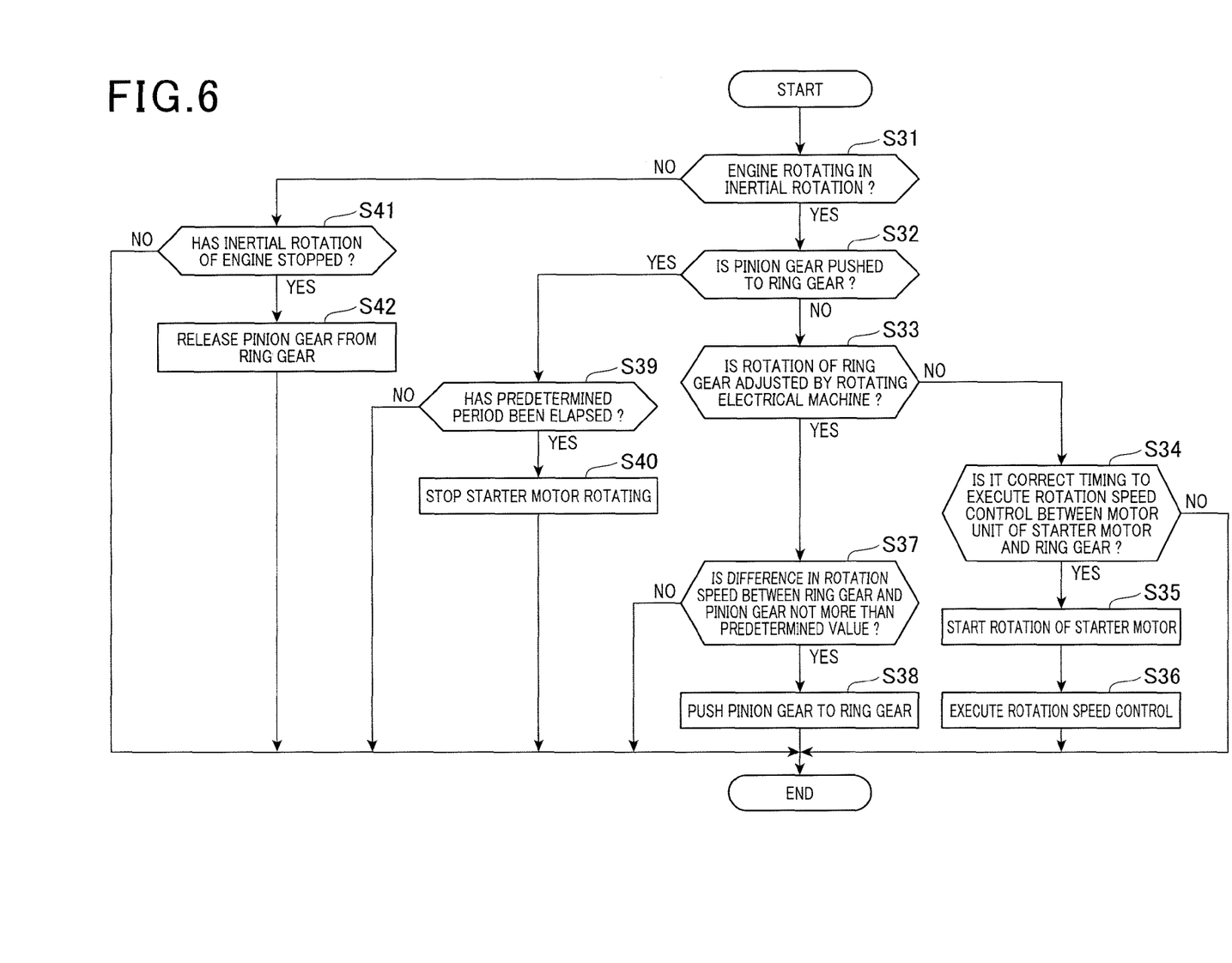
FIG. 6 is a view showing a timing chart of a pushing control process executed by the engine start system according to the exemplary embodiment shown in FIG. 1.

FIG. 6 is a view showing a timing chart of the pushing control process executed by the engine start system according to the exemplary embodiment shown in FIG. 1.

The ISG controller 40 repeatedly executes the pushing control process shown in FIG. 6 every predetermined period when the automatic engine stop of the engine 11 has been satisfied or the driver of the vehicle has turned off the ignition switch of the vehicle.

In step S31 shown in FIG. 6, the ISG controller 40 detects whether the engine 11 is rotating in inertial rotation. When the fuel injection into the engine 11 has been stopped, and the output shaft 15 of the engine 11 is rotating, the ISG controller 40 detects the inertial rotation of the engine 11.

When the detection result in step S31 indicates affirmation ("YES" in step S31), i.e. the engine 11 is rotating in inertial rotation the operation flow progresses to step S32.

In step S32, the ISG controller 40 detects whether the switch unit 26 has been turned on, i.e. the pinion gear 19 has been pushed to the ring gear 16.

When the detection result in step S32 indicates negation ("NO" in step S32), i.e. the switch unit 26 has not been turned on, the operation flow progresses to step S33.

In step S33, the ISG controller 40 detects whether the rotation of the ring gear 16 has now been adjusted by using the rotating electrical machine 13.

Immediately after the engine 11 automatically stops by the idle reduction control, because the detection result in step S32 indicates negation ("NO" in step S32) and the detection result in step S33 indicates negation ("NO" in step S33), the operation flow progresses to step S34.

In step S34, the ISG controller 40 detects that it is a timing to execute a rotation speed control between the motor unit 18 of the starter motor 12 and the ring gear 16. That is, the ISG controller 40 detects whether it is a correct timing to adjust the rotation speed of the motor unit 18 of the starter motor 12 and the rotation speed of the ring gear 16 on the basis of the rotation speed of the engine 11. For example, when the rotation speed of the engine 11 has reached to a predetermined rotation speed, the judgment result in step S34 indicates affirmation ("YES" in step S34).

That is, when the judgment result in step S34 indicates affirmation ("YES" in step S34), i.e. it is a correct timing to adjust the rotation speed of the motor unit 18 of the starter motor 12 and the rotation speed of the ring gear 16, the operation flow progresses to step S35.

In step S35, when the ISG controller 40 turns on the switch unit 31, the motor unit 18 of the starter motor 12 starts to operate. The operation flow progresses to step S36.

In step S36, the ISG controller 40 adjusts the rotation speed of the rotating electrical machine 13 so that the rotation speed of the ring gear 16 becomes a predetermined rotation value (as the starter rotation speed). It is preferable to calculate the rotation speed of the starter motor 12 on the basis of the voltage of the battery 14.

On the other hand, when the judgment result in step S33 indicates affirmation ("YES" in step S33), the operation flow progresses to step S37.

In step S37, the ISG controller 40 detects whether a difference between a rotation speed of the ring gear 16 and a rotation speed of the pinion gear 19 is not more than a predetermined value.

When the detection result in step S37 indicates affirmation ("YES" in step S37), i.e. the detected difference is not more than the predetermined value, the operation flow progresses to step S38.

In step S38, the ISG controller 40 turns on the switch unit 26 so as to execute the pushing control process of the pinion gear 19 to the ring gear 16.

On the other hand, when the judgment result in step S32 indicates affirmation ("YES" in step S32), the operation flow progresses to step S39.

In step S39, the ISG controller 40 detects whether a predetermined period counted form the pushing of the pinion gear 19 has been elapsed.

When the detection result in step S39 indicates affirmation ("YES" in step S39), the operation flow progresses to step S40.

In step S40, the ISG controller 40 turns off the switch unit 31 so as to stop the rotation of the motor unit 18 in the starter motor 12.

When the judgment result in step S31 indicates negation ("NO" in step S31), the operation flow progresses to step S41.

In step S41, the ISG controller 40 detects whether the inertial rotation of the engine 11 has stopped rotating due to the stop of rotation of the starter motor 12.

When the judgment result in step S41 indicates affirmation ("YES" in step S41), i.e. the inertial rotation of the engine 11 has stopped rotating, the operation flow progresses to step S42.

In step S42, the ISG controller 40 turns off the switch unit 26 so as to stop the pushing control process of the pinion gear 19, i.e. so as to release the pinion gear 19 from the ring gear 16. After the process in step S42, the ISG controller 40 finishes the pushing control process shown in FIG. 6.

On the other hand, when the judgment result in step S41 indicates negation ("NO" in step S41), the ISG controller 40 finishes the pushing control process shown in FIG. 6.

Further, when the judgment result in step S39 indicates negation ("NO" in step S39), the ISG controller 40 finishes the pushing control process shown in FIG. 6.

Still further, when the judgment result in step S37 indicates negation ("NO" in step S37), the ISG controller 40 finishes the pushing control process shown in FIG. 6.

Still further, when the judgment result in step S34 indicates negation ("NO" in step S34), the ISG controller 40 finishes the pushing control process shown in FIG. 6.

After the process in step S40, the ISG controller 40 finishes the pushing control process shown in FIG. 6.

Further, after the process in step S36 and the process in step S38, the ISG controller 40 finishes the pushing control process shown in FIG. 6.

According to the improved structure of the engine start system according to the exemplary embodiment and its modification, as previously explained, the pinion gear 19 is pushed to the ring gear 16 only when the difference in rotation speed between the ring gear 16 and the pinion gear 19 is not more than the predetermined value. It is thereby possible to smoothly and correctly engage the pinion gear 19 with the ring gear 16.

Furthermore, only the ISG controller 40 obtains the rotation speed of the ring gear (i.e. the rotation speed of the rotating electrical machine 13), and turns on and off the switch unit 26. This makes it possible to prevent the structure of the engine start system from being complicated, and to instruct the switch unit 26 to turn on and off at a desired timing.

The engine start system according to the exemplary embodiment has the improved structure in which the rotating electrical machine 13, the inverter 25 and the ISG controller 40 are assembled together. However, the concept of the present invention is not limited by this structure. For example, it is acceptable to have another structure in which each of the rotating electrical machine 13 and the inverter 25 is independently arranged, and on the other hand, the inverter 25 and the ISG controller 40 are assembled together.

In the structure of the engine start system according to the exemplary embodiment previously described, the rotary shaft 21 of the rotating electrical machine 13 is connected to the output shaft 15 of the engine 11 through the belt 23. However, the concept of the present invention is not limited by this structure. For example, it is acceptable to have another structure in which the rotary shaft 21 of the rotating electrical machine 13 is connected to the output shaft 15 of the engine 11 through the clutch mechanism.

While specific embodiments of the present invention have been described in detail, it will be appreciated by those skilled in the art that various modifications and alternatives to those details could be developed in light of the overall teachings of the disclosure. Accordingly, the particular arrangements disclosed are meant to be illustrative only and not limited to the scope of the present invention which is to be given the full breadth of the following claims and all equivalents thereof.

What is claimed is:

1. An engine start system comprising:
   a rotating electrical machine connected to an output shaft of an engine and driven by an electric power regulation circuit capable of performing power running and regenerative power generation;
   a starter motor configured to start and restart the engine;
   a first control device capable of adjusting operation of the engine; and
   a second control device capable of transmitting an instruction to the electric power regulation circuit to execute an electric power regulation when the rotating electrical machine performs power running and regenerative power generation, the second control device communicating with the first control device, and adjusting the operation of the starter motor and the rotating electrical machine, and when receiving an engine restart request, the second control device instructing at least one of the starter motor and the rotating electrical machine to operate so as to execute a quick restart of the engine.

2. The engine start system according to claim 1, wherein the starter motor comprises a pinion gear, a drive section, and a switch section, wherein the pinion gear is capable of engaging with a ring gear which is fixed to the output shaft of the engine so that the pinion gear and the ring gear are engaged and rotate simultaneously, the drive section drives the pinion gear, and the switch section instructs the drive section to turn on to allow power supply and to turn off to halt the power supply, and
   the second control device executes turn-on and off of the switch section on the basis of the engine restart request so as to drive the starter motor, and instructs the electric power regulation circuit to drive the rotating electrical machine.

3. The engine start system according to claim 2, wherein at restart of the engine, the second control device selects and executes one of:
   a first start process in which the second control device instructs the starter motor to drive the engine to be restarted;
   a second start process in which the second control device instructs the electric power regulation circuit so that the rotating electrical machine drives the engine to be restarted; and
   a third start process in which the second control device instructs the starter motor and the electric power regulation circuit so that the starter motor and the rotating electrical machine drive the engine to restart.

4. The engine start system according to claim 3, wherein during a period from a start timing of the engine start to a finish timing of the engine start in the third start process, the second control device firstly instructs the starter motor to drive the engine to operate, and stops the operation of the starter motor, and secondly instructs the electric power regulation circuit so that the rotating electrical machine drives the engine to operate.

5. The engine start system according to claim 3, wherein when the second control device has a function to drive the engine to automatically stop its operating when a predetermined automatic engine stop condition has been satisfied, and a function to drive the engine to be restarted when a predetermined automatic engine restart condition has been satisfied, and the second control device selects one of the first start process, the second start process, and the third start process on the basis of a rotation speed of the engine at a timing when the predetermined automatic engine restart condition has been satisfied.

6. The engine start system according to claim 3, wherein in the third start process, the first control device receives a rotation torque of the output shaft of the engine, and the second control device detects an occurrence of abnormality of the starter motor on the basis of the rotation torque of the output shaft of the engine.

7. The engine start system according to claim 1, wherein at restart of the engine, the second control device selects and executes one of:

a first start process in which the second control device instructs the starter motor to drive the engine to be restarted;

a second start process in which the second control device instructs the electric power regulation circuit so that the rotating electrical machine drives the engine to be restarted; and a third start process in which the second control device instructs the starter motor and the electric power regulation circuit so that the starter motor and the rotating electrical machine drive the engine to restart.

8. The engine start system according to claim 7, wherein during a period from a start timing of the engine start to a finish timing of the engine start in the third start process, the second control device firstly instructs the starter motor to drive the engine to operate, and stops the operation of the starter motor, and secondly instructs the electric power regulation circuit so that the rotating electrical machine drives the engine to operate.

9. The engine start system according to claim 7, wherein when the second control device has a function to drive the engine to automatically stop its operating when a predetermined automatic engine stop condition has been satisfied, and a function to drive the engine to be restarted when a predetermined automatic engine restart condition has been satisfied, and the second control device selects one of the first start process, the second start process, and the third start process on the basis of a rotation speed of the engine at a timing when the predetermined automatic engine restart condition has been satisfied.

10. The engine start system according to claim 7, wherein in the third start process, the first control device receives a rotation torque of the output shaft of the engine, and the second control device detects an occurrence of abnormality of the starter motor on the basis of the rotation torque of the output shaft of the engine.

* * * * *